United States Patent [19]

Meiler et al.

[11] Patent Number: 5,002,334
[45] Date of Patent: Mar. 26, 1991

[54] VEHICLE ROOF

[75] Inventors: Klaus Meiler, Poecking; Hans Jardin, Inning; Andreas Hafner, Inning/Buch, all of Fed. Rep. of Germany

[73] Assignee: Webasto AG Fahrzeugtechnik, Fed. Rep. of Germany

[21] Appl. No.: 349,826

[22] Filed: May 10, 1989

[30] Foreign Application Priority Data

May 25, 1988 [DE] Fed. Rep. of Germany ....... 3817681

[51] Int. Cl.⁵ .............................................. B60J 7/05
[52] U.S. Cl. ................................... 296/214; 296/216; 296/221
[58] Field of Search ...................... 296/214, 216, 221

[56] References Cited

U.S. PATENT DOCUMENTS

| | | | |
|---|---|---|---|
| 3,960,404 | 6/1976 | Bienert | 296/221 |
| 4,626,023 | 12/1986 | Lutz | 296/221 |
| 4,699,421 | 10/1987 | Schaetzler et al. | 296/216 |
| 4,702,518 | 10/1987 | Paerisch et al. | 296/214 |
| 4,722,565 | 2/1988 | Kanou et al. | 296/214 |
| 4,813,734 | 3/1989 | Schlapp | 296/214 |
| 4,840,832 | 6/1989 | Weinle et al. | 296/214 |

*Primary Examiner*—Robert R. Song
*Attorney, Agent, or Firm*—Sixbey, Friedman, Leedom & Ferguson

[57] ABSTRACT

Vehicle roof having a cover which, in a closed position, covers a roof opening in a fixed roof surface, and which can be extended above a fixed roof surface by pivotal movement about a pivotal axis which extends between its lateral edges. Below the cover, a cover liner is provided which, during upward extension of the cover, is bent about a center axis which is parallel to the pivotal axis of the cover. The liner, in a transversely extending center area, is provided with at least one cutout that extends transversely across a main portion of the liner and which reaches downwardly from the upper side of the liner, through a portion of the thickness of the liner sufficient to create a flexible hinge-like portion, thus permitting the liner to bend when the cover is extended. When the liner is in its unbent condition, the cutout has a cross-sectional shape that widens upwardly.

20 Claims, 3 Drawing Sheets

FIG. 5
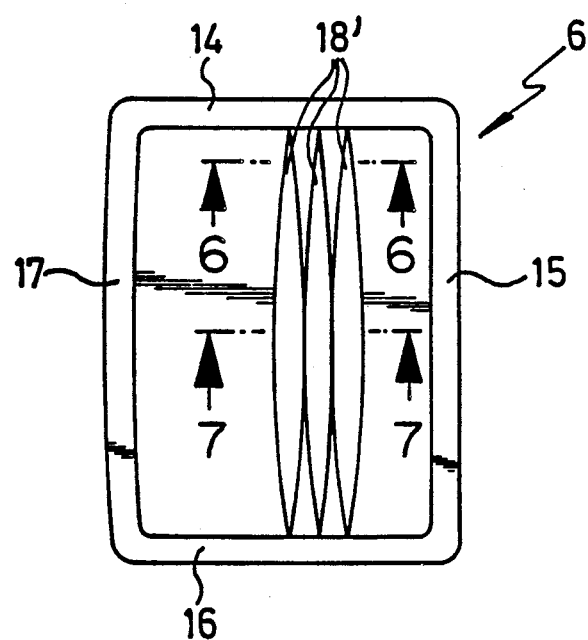
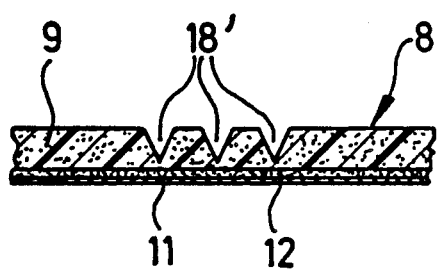
FIG. 6
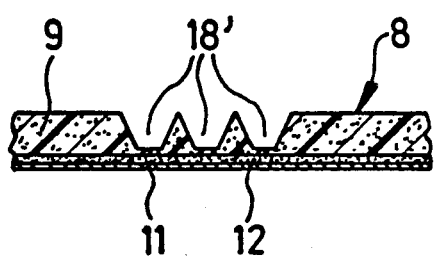
FIG. 7

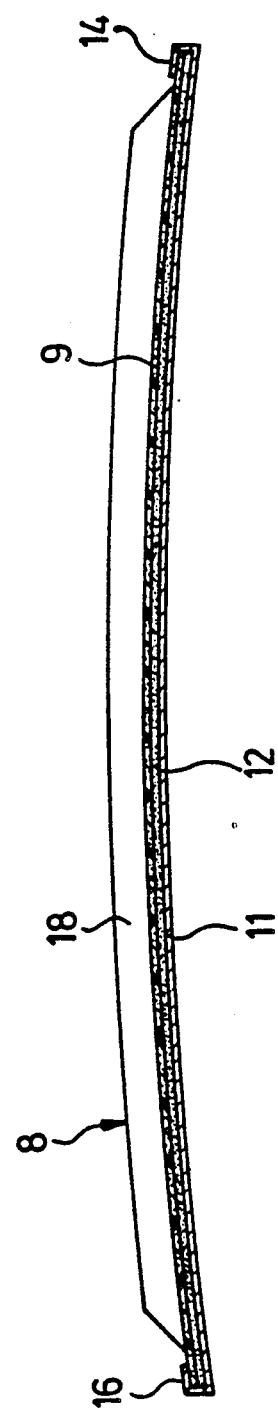

VEHICLE ROOF

BACKGROUND OF THE INVENTION

The invention relates to a vehicle roof having a cover, which in a closed position closes a roof opening in a fixed roof surface, and which is extendable above the fixed roof surface by pivotal movement around a pivot axis extending between its lateral edges. More particularly, the invention is related to such a vehicle roof that, additionally, has a liner disposed below the cover which, during pivotal lifting of the cover, is bent around an axis disposed parallel to the pivotal axis of the cover.

In a known vehicle roof of this kind (U.S. Pat. No. 4,626,023), a sliding liner is constructed as a sandwich panel with a core layer and a lower cover layer; and the cover layer, covering at least the underside of the core layer, is compressed along with the core layer at the lateral edges of the panel to form guide members. The result is a gap in the underside of the liner that is visible from the interior of the vehicle, a result which is often deemed undesirable for reasons of aesthetics. Moreover, the manufacture of such a conventional liner is rather expensive and it is neither intended nor suitable for this known sliding liner to follow upward swinging of the roof cover by bending.

There is also known, from U.S. Pat. No. 3,960,404, a motor vehicle roof with an upwardly extendable cover having a liner that moves in unison with sliding and lifting movements of the cover. The liner has a fabric-covered liner frame consisting of three cross members which are interconnected by lateral brace elements made of spring steel bands. During upward swinging of the cover, the longitudinal brace elements are elastically deformed, to which end a relatively high spring bias has to be overcome, leading, in turn, to an undesirable increase in the torque to be created for actuation of the roof.

SUMMARY OF THE INVENTION

The invention, therefore, has a primary objective to provide a vehicle roof with an upwardly pivotable cover and a liner that cooperates in part with the cover extension movements, whereby the liner maintains an attractive appearance from below, in any operating position.

A further, more specific, object is to provide a vehicle roof of the noted type wherein the slidable liner is able to bend upwardly as the cover is swung upwardly, and wherein the power required for the bending of the liner is relatively low as is the cost of its manufacture and installation.

These objectives and others are obtained, in accordance with preferred embodiments of the invention, by providing a vehicle roof of the kind described above wherein the liner, in the area of the center transverse axis, has at least one cutout which extends downwardly from the top side of the liner across a portion of its height, parallel to the center axis. The cutout, in the unbent state of the liner, widens upwardly, permitting bending of the liner when the cover is pivoted upwardly, due to the flexibility of the liner part which is not severed by the cutout.

The vehicle roof according to the invention does not have an undesirable gap at the underside of the liner in the area of the center axis. The part of the liner, made of synthetic material, which is not separated by the cutout, imparts an adequate spring bias to return the liner to its unbent, initial starting position as the cover is returned from the upwardly extended cover position into the closed position. The spring bias to be overcome during the extension of the cover is less than that exerted with the conventional approach, discussed above, using bracing members of longitudinal spring steel bands. Manufacture and installation of the liner is simple and uncomplicated.

The cutout or cutouts can be molded in during the manufacture of the liner, such as by injection molding. Alternatively, it is possible to subsequently work these cutouts into the finished liner, for instance by sawing, milling, or a similar process.

In accordance with another advantageous aspect of the invention, the liner is formed of a sandwich panel having a core layer and at least one cover layer that covers the underside of the core layer. The sandwich panel has flanges, at least in the area of the lateral edges of the panel, which extend vertically to the center plane of the panel, i.e., the flanges have a thickness which is smaller that of the main part of the sandwich panel. The at least one cutout is provided in the thicker, main part of the panel, which is disposed between the flanges. A sandwich panel of this kind provides good sound muffling and is of relatively light weight. The cutouts in such a sandwich panel liner may terminate before they reach the underside of the core layer, or may extend to the underside of the core layer.

Preferably, the underside of the liner, at least in part, consists of a liner fabric, or is covered with a liner fabric, and the liner fabric is glued to the full area of the bottom liner surface. In this manner, a flapping of the liner is prevented in any of the operating positions of the roof.

By an appropriate selection of the number and shape of the cutouts, varying bent configurations of the liner can be achieved. A single cutout results in a relatively sharp bend line. As a rule, a visually more pleasing effect is obtained with a more or less greater radius of curvature in the area of the center transverse axis, or with a bend curvature that deviates from a circular arc, to which end it is advantageous to provide several cutouts, extending in parallel.

In a curved liner, the cutout or cutouts, in the unbent state of the liner, may have a curvature dependent width that varies in a manner such that, after bending, the upper edges of the cutout extend essentially parallel to each other. A configuration like this also permits the bending of curved liners in a satisfactory and problem-free manner when upwardly extending the cover.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 5 is a top view onto a liner in accordance with a modified embodiment of the invention;

FIGS. 6 and 7 are longitudinal sectional views through the liner taken along line VI—VI and line VII—VII, respectively, of FIG. 5; and FIG. 8 is a cross-sectional view of the liner of FIG. 5 taken along the length of one of the transversely extending cutouts formed therein.

DETAILED DESCRIPTION OF THE PREFERRED EMBODIMENTS

Figure 1:
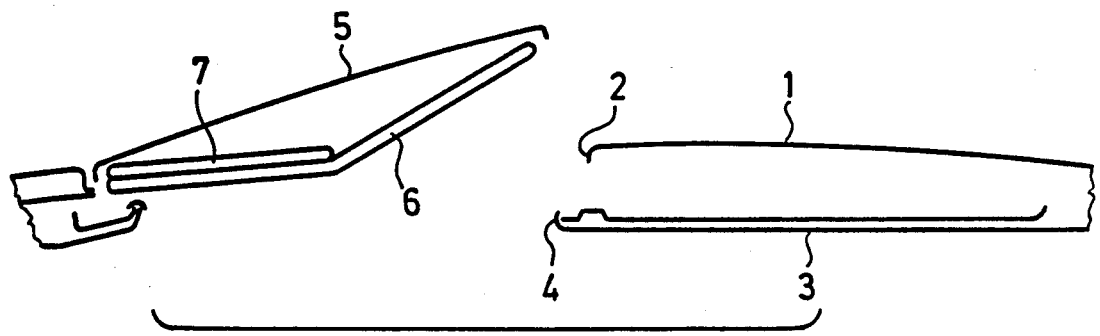
FIG. 1 is a schematic view of a longitudinal section through a sliding and lifting roof.

As can be seen from FIG. 1 the front part of a fixed roof surface 1 of a vehicle has a rectangular roof opening 2, at the underside of which a roof frame 3 is provided. Roof frame 3 defines a frame opening 4 which essentially corresponds to roof opening 2. A cover 5 is guided at both sides of roof opening 4 of roof frame 3 in tracks (not shown) for closing, or at least partially exposing the roof opening 2. By means of a drive element, cover 5 can be, selectively, brought into a closed position, in which it closes roof opening 2; into an upwardly extended position, in which cover 5 can be extended upwardly above the fixed roof surface 1 by pivotal movement around a pivot axis located near its front edge; and into a retracted position, in which cover 5 is positioned between the fixed roof surface 1 and the roof frame 3 at the rear side of roof opening 2, in order to expose roof opening 2. Such movements can be achieved by any known drive arrangement for sliding and lifting roofs. One such known arrangement is shown in U.S. Pat. No. 4,699,421, and to the extent necessary to complete an understanding of this invention, such is hereby incorporated by reference.

A liner 6 is provided by which the opening 4 of the roof frame 3 can selectively be exposed or closed. Liner 6 can be displaced in the vehicle longitudinal direction in between a closed position, in which it covers frame opening 4, and an open position in which liner 6 is located at the rear side of roof opening 2, between the fixed roof surface 1 and the roof frame 3, exposing the frame opening 4. When cover 5 and liner 6 are in their forward end positions, and cover 5 is extended upwardly into the FIG. 1 vent position, the forward part of liner 6 is bilaterally guided by a guide element 7, forming part of the two guide tracks. The rearward portion of liner 6, contrary thereto, is free of the guide element and is coupled to the rear portion of cover 5 or the lifting mechanism therefor so that it is brought into an extended slanted position by the effects of this interaction, or such can be produced by manual operation. The actual mechanism by which the rear part of liner 6 is raised forms no part of this invention and such may be similar to that used to raise the liftable forward part of the liner panel of U.S. Pat. No. 4,702,518. To enable the liner to be so manipulated, as described in greater detail below, liner 6 is designed to bend in a central area extending transversely to the vehicle longitudinal direction, whereby the rearward portion of the liner assumes a rearwardly ascending slant position. A ventilation gap is thus created between fixed roof surface 1 and both cover 5 and liner 6.

Liner 6 consists primarily of a sandwich panel 8 having a core layer 9 and a lower cover layer 10. Cover layer 10 has a two-layer construction in the example depicted. The lower layer 11 consists of a liner material which may be matched to the fixed headlining of the vehicle interior, and the upper layer 12 consists of sound-muffling foam material. Core layer 9 can, advantageously, have a honeycomb structure made of plastic material, saturated paper or metal foil, particularly aluminum foil. Preferably, the honeycombs of core layer 9 are filled, at least partially, with a rigid expanded foam filling. The layers 11 and 12 are glued to one another and are glued to core layer 9 over their entire adjoining surfaces. The sandwich panel 8 has a relatively thick main part 13, as well as flanges 14, 15, 16 and 17, in the area of the panel edges, which have a thickness which is smaller than that of main part 13. Flanges 14 to 17, appropriately, are obtained in that the initially uniformly thick sandwich panel is compressed in the area of its edges, as is described in U.S. Pat. No. 4,626,023, which is also incorporated herein by reference.

Figure 2:
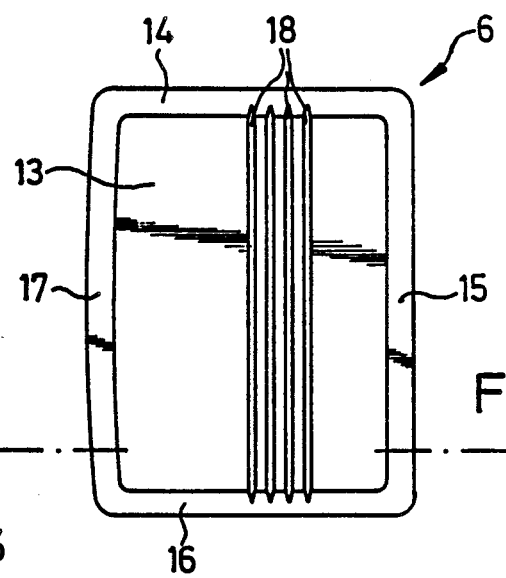
FIG. 2 is a top view onto a liner of the FIG. 1 roof in an unbent condition.
Figure 3:
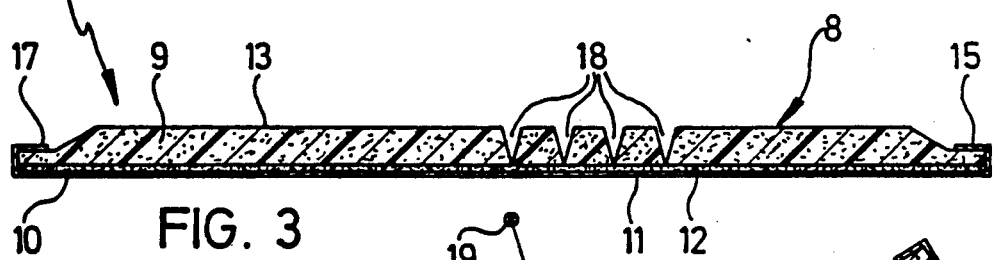
FIG. 3 is a longitudinal section through the liner taken along line III—III of FIG. 2.
Figure 4:
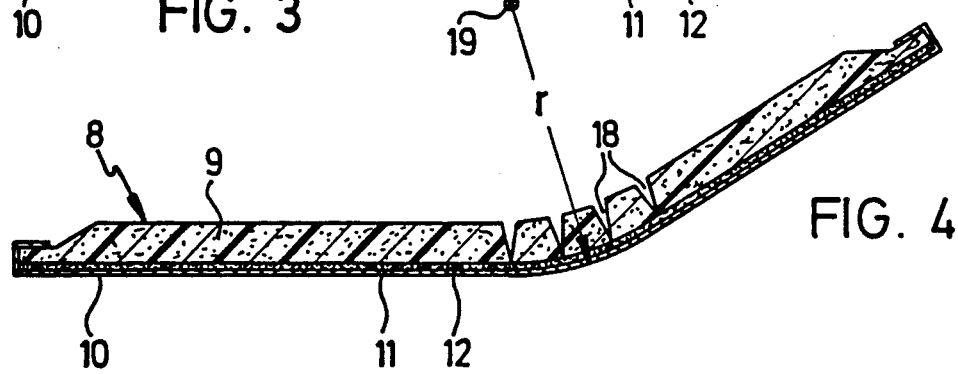
FIG. 4 is a longitudinal section in accordance with FIG. 3, in which the liner is depicted in the position which it assumes when the cover is upwardly extended into the FIG. 1 position.

In the liner embodiment according to FIGS. 2, 3 and 4, the thicker main part 13 of sandwich panel 8 is provided with four cutouts 18 that extend transversely relative to the vehicle longitudinal direction with the cutouts widening upwardly when the panel is in its flat, unbent, state. The cutouts 18 extend across the full width of main part 13, and as shown in FIGS. 3 and 4, extend to the underside of core layer 9. The cutouts are V-shaped notches or grooves and can be molded into the sandwich panel during its manufacture, or can be subsequently worked-in by sawing or milling, for example. When cover 5 is pivoted to extend upwardly, the cutouts 18 permit bending of liner 6 with a radius of curvature r around a center of curvature axis 19, in the manner indicated in FIG. 4, whereby flanges 14 and 16 are able to correspondingly bend due to the inherent flexibility of the fabric and foam layers 11, 12 of cover layer 10.

While in the embodiment of FIGS. 2 to 4 the cutouts 18 have a uniform cross section along their length, FIGS. 5 to 7 show a variation thereof wherein cutouts 18' are provided which have widths that vary along their length, i.e., transversely across main part 13 of liner 6'. In this embodiment, cutouts 18' are broader in their center part (FIG. 7), i.e., toward the longitudinal center line of the liner 6', than they are near the lateral edges of the liner 6' (FIG. 6). Because the cutouts 18' have widths that vary, as indicated, they facilitate the bending of a curved liner (one which is transversely bowed, as shown in FIG. 8) in a desirable manner in that they enable the upper edges of the cutouts 18' to become essentially parallel to one another after bending. The embodiment according to FIGS. 5-7 differs from the one described above in that the cutouts 18 terminate shortly before reaching the underside of the core layer 9; although this aspect is applicable to the liner 6 of FIGS. 2-4, as well.

The described liner configurations are suitable for lifting roofs as well as sliding and lifting roofs, regardless of whether the cover is made of transparent, translucent or opaque material. By varying the number of cutouts 18, 18', the bending characteristics of the liner, and particularly the size of the curvature radius r, can be controlled. The liner described does not require any additional parts, such as lateral springs, since the hinge-like portions of the liner formed by layers 11, 12 (and any portions of core layer 9 which remain at the bottom of the cutouts 18') provide an adequate spring bias to return the liner to its unbent, initial starting position.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. Vehicle roof having a roof opening in a fixed roof surface, a cover for closing the roof opening which is extendable above the fixed roof surface into an upwardly pivoted vent position, and having a liner arranged below the cover which has a forward part that is guided at each lateral edge by a guide element and has a bendable, transversely extending center portion for enabling raising of a rear portion of the liner when the cover is upwardly pivoted, wherein said bendable center portion is provided with at least one cutout that extends transversely across the liner and extends downwardly from an upper side of the liner through a portion of the thickness of the liner, leaving a hinge-like portion which is not separated by the cutout, said cutout having cross-sectional configuration when the liner is in an unbent state which facilitates bending of the liner due to an inherent flexibility of the hinge-like portion of the liner.

2. Vehicle roof according to claim 1, wherein the liner is in the form of a sandwich panel having a core layer and at least one cover layer that covers the underside of the core layer; wherein the sandwich panel, at least in lateral edge areas, is provided with flanges of reduced thickness, relative to that of a main part of the sandwich panel; and wherein said at least one cutout is provided in the main part, between the flanges.

3. Vehicle roof according to claim 2, wherein said at least one cutout terminates before reaching the underside of the core layer.

4. Vehicle roof according to claim 3, wherein an underside of the liner, at least in part, comprises a liner fabric.

5. Vehicle roof according to claim 3, wherein said liner has more than one said cutout which are disposed parallel to each other.

6. Vehicle roof according to claim 3, wherein said liner has a transversely bowed curvature and each cutout, in the unbent state of the liner, has a curvature-dependent width that varies such that, after bending, upper edges of the cutout extend essentially parallel to each other.

7. Vehicle roof according to claim 2, wherein said at least one cutout extends to the underside of the core layer.

8. Vehicle roof according to claim 4, wherein an underside of the liner, at least in part, comprises a liner fabric.

9. Vehicle roof according to claim 8, wherein said liner has more than one said cutout which are disposed parallel to each other.

10. Vehicle roof according to claim 1, wherein said liner has more than one said cutout which are disposed parallel to each other.

11. Vehicle roof according to claim 2, wherein an underside of the liner, at least in part, comprises a liner fabric.

12. Vehicle roof according to claim 11, wherein said liner has more than one said cutout which are disposed parallel to each other.

13. Vehicle roof according to claim 12, wherein said liner has a transversely bowed curvature and each cutout, in the unbent state of the liner, has a curvature-dependent width that varies such that, after bending, upper edges of the cutout extend essentially parallel to each other.

14. Vehicle roof according to claim 13, wherein said upper edges are arcuate with said curvaturedependent width tapering laterally outwardly from a longitudinal center line of the liner.

15. Vehicle roof according to claim 14, wherein said at least one cutout terminates before reaching the underside of the core layer.

16. Vehicle roof according to claim 12, wherein said liner has a transversely bowed curvature and each cutout, in the unbent state of the liner, has a curvature-dependent width that varies such that, after bending, upper edges of the cutout extend essentially parallel to each other.

17. Vehicle roof according to claim 2, wherein said liner has a transversely bowed curvature and each cutout, in the unbent state of the liner, has a curvature-dependent width that varies such that, after bending, upper edges of the cutout extend essentially parallel to each other.

18. Vehicle roof according to claim 1, wherein said liner has a transversely bowed curvature and each cutout, in the unbent state of the liner, has a curvature-dependent width that varies such that, after bending, upper edges of the cutout extend essentially parallel to each other.

19. Vehicle roof according to claim 1, wherein said liner has more than one said cutout which are disposed parallel to each other.

20. Vehicle roof according to claim 1, where the cross-sectional configuration of said at least one cutout widens in an upward direction.

* * * * *